United States Patent
Liang et al.

(10) Patent No.: US 12,221,061 B2
(45) Date of Patent: Feb. 11, 2025

(54) OFF-ROAD VEHICLE AND CONTROL METHODS THEREOF

(71) Applicant: Zhejiang CFMOTO Power Co., Ltd., Zhejiang (CN)

(72) Inventors: Haifeng Liang, Hangzhou (CN); Linglong Meng, Hangzhou (CN); Jeffrey D. Shewchuk, Inver Grove Heights, MN (US)

(73) Assignee: Zhejiang CFMoto Power Co. Ltd., Zhejiang (CN)

( * ) Notice: Subject to any disclaimer, the term of this patent is extended or adjusted under 35 U.S.C. 154(b) by 0 days.

(21) Appl. No.: 18/510,501

(22) Filed: Nov. 15, 2023

(65) Prior Publication Data

US 2024/0166161 A1  May 23, 2024

(30) Foreign Application Priority Data

Nov. 21, 2022  (CN) .................. 202211463042.X
Apr. 4, 2023  (CN) .................. 202310362625.1
(Continued)

(51) Int. Cl.
*B60R 22/48*  (2006.01)
*B60K 28/10*  (2006.01)
(Continued)

(52) U.S. Cl.
CPC ............ *B60R 22/48* (2013.01); *B60K 28/10* (2013.01); *B60K 31/00* (2013.01); *B62J 6/24* (2020.02);
(Continued)

(58) Field of Classification Search
CPC ............ B60R 22/48; B60R 2022/4891; B60R 2022/4866; B60R 16/023; B60K 28/10;
(Continued)

(56) References Cited

U.S. PATENT DOCUMENTS 3,438,455 A * 4/1969 Redmond ............... B60R 22/48
340/687
3,787,804 A * 1/1974 MacDonald ............ B60R 22/48
340/687

(Continued)

*Primary Examiner* — Keith J Frisby
(74) *Attorney, Agent, or Firm* — Shewchuk IP Services, LLC; Jeffrey D. Shewchuk

(57) ABSTRACT

An off-road vehicle includes a control module which limits power source rotational speed beneath a controlled rotational speed value based both on whether a protection device such as a safety belt is engaged or disengaged and on whether the vehicle velocity is greater than or less than a velocity threshold. If the safety belt becomes disengaged while the power source is spinning above the controlled rotational speed value, the control module gradually and safely reduces power source rotational speed. If/when the safety belt becomes reengaged, the control module logic will ensure that the power source rotational speed is released from the controlled first value without immediate change in vehicle response. The invention effectively reduces safety hazards of safety belt disengagement while not creating safety hazards of its own in a wide range of discussed situations.

20 Claims, 8 Drawing Sheets

(30) Foreign Application Priority Data

May 12, 2023 (CN) .......................... 202310544797.0
May 23, 2023 (CN) .......................... 202310581845.3

(51) Int. Cl.
  *B60K 31/00* (2006.01)
  *B62J 6/24* (2020.01)
  *F02D 31/00* (2006.01)

(52) U.S. Cl.
  CPC ...... *F02D 31/00* (2013.01); *B60K 2031/0091* (2013.01); *B60R 2022/4891* (2013.01)

(58) Field of Classification Search
  CPC .. B60K 31/00; B60K 2031/0091; B62K 5/01; B60L 15/20; B62J 3/12; B62J 6/24; B62J 45/412; B62J 50/22; F02D 31/00; F02D 31/001; F02D 45/00; B60Y 2200/124; B60Y 2200/20
  USPC .............. 180/268, 271, 170; 701/45, 54, 93; 280/801.1
  See application file for complete search history.

(56) References Cited

U.S. PATENT DOCUMENTS

| | | | |
|---|---|---|---|
| 3,831,140 A * | 8/1974 | Anderson, Jr. | B60R 22/48 340/687 |
| 6,260,650 B1 * | 7/2001 | Gustavsson | B60K 28/04 180/270 |
| 7,937,202 B2 * | 5/2011 | Van Houten | B60R 22/48 701/45 |
| 8,464,824 B1 | 6/2013 | Reisenberger | |
| 8,548,710 B1 | 10/2013 | Reisenberger | |
| 8,781,705 B1 | 7/2014 | Reisenberger | |
| 9,499,124 B2 | 11/2016 | Kawakatsu et al. | |
| 9,616,747 B1 * | 4/2017 | Breed | B60W 30/146 |
| 9,758,040 B1 | 9/2017 | Reid et al. | |
| 9,889,738 B1 | 2/2018 | Reid et al. | |
| 10,086,698 B2 * | 10/2018 | Grajkowski | B60K 28/10 |
| 10,507,790 B1 * | 12/2019 | Banks | B60R 22/48 |
| 10,632,844 B2 | 4/2020 | Reid et al. | |
| 10,850,613 B2 | 12/2020 | Reid et al. | |
| 10,994,697 B2 * | 5/2021 | Jessup | G01D 5/245 |
| 2007/0028888 A1 * | 2/2007 | Jasem | B60K 28/12 123/396 |
| 2007/0285219 A1 * | 12/2007 | Greene | B60R 22/48 340/457.1 |
| 2008/0309061 A1 * | 12/2008 | Mundy | B60R 22/48 280/801.1 |
| 2013/0289797 A1 * | 10/2013 | Johnson | B60W 30/146 701/1 |
| 2016/0207418 A1 * | 7/2016 | Bergstrom | B60G 3/06 |
| 2017/0284540 A1 * | 10/2017 | Sakamoto | B60K 28/02 |
| 2017/0364080 A1 * | 12/2017 | Chintakindi | B60Q 1/50 |
| 2018/0065596 A1 * | 3/2018 | Makabe | B60W 50/0098 |
| 2018/0222441 A1 * | 8/2018 | Koase | B60R 22/48 |
| 2018/0236896 A1 * | 8/2018 | Bessho | B60R 21/02 |
| 2019/0225186 A1 * | 7/2019 | Szawarski | G06V 20/597 |

* cited by examiner

OFF-ROAD VEHICLE AND CONTROL METHODS THEREOF

RELATED APPLICATION INFORMATION

The present application claims the benefits of priority to Chinese Patent Application No. 202211463042.X, filed with the Chinese Patent Office on Nov. 21, 2022, Chinese Patent Application No. 202310362625.1, filed with the Chinese Patent Office on Apr. 4, 2023, Chinese Patent Application No. 202310544797.0, filed with the Chinese Patent Office on May 12, 2023, and Chinese Patent Application No. 202310581845.3, filed with the Chinese Patent Office on May 23, 2023. The entire contents of the above-referenced applications are incorporated herein by reference.

FIELD OF THE INVENTION

The present invention relates to the field of vehicles, and in particular to off-road vehicles and control methods thereof.

BACKGROUND OF THE INVENTION

Off-road vehicles refer to vehicles that can travel freely on various complex terrains where ordinary vehicles are difficult to maneuver. Some people also refer to one type of off-road vehicles as a "four wheeled motorcycle" due to its structure having a straddle seat similar to a motorcycle and many components in off-road vehicles being common to motorcycles. Other types of off-road vehicles, referred to as utility vehicles and side-by-sides, have driver seats and passenger seats which are not straddled. All of these types of off-road vehicle are highly popular in the market because they have multiple uses and are not limited by road conditions.

Considering that off-road vehicles have excellent off-road performance and travel in complex environments, such as dusty, sandy deserts, rocky terrain and muddy swamps, the safety belts and other protective devices on the driver's seat when driving an off-road vehicle have become the most effective passive safety equipment as the main driver restraint protection equipment. Therefore, the bad habit of some drivers of not wearing a safety belt when driving an off-road vehicle poses a significant threat to personal safety.

Various attempts have been made to address this safety problem. In the U.S., the Recreational Off-Highway Vehicle Association ("ROHVA") has promulgated various standards associated with occupant retention systems. See ANSI/ROHVA 1-2016 Section 12. Various off-road vehicle manufacturers have patented proposed solutions, including those discussed in U.S. Pat. Nos. 8,464,824, 8,548,710, 8,781,705, 9,499,124, 9,758,040, 9,889,738, 10,632,844 and 10,850,613, incorporated by reference for their background teachings. In general, however, these various proposed solutions all have undesirable shortcomings on the performance of the vehicle, including aspects which may make the vehicle more dangerous (rather than less) in certain situations. Better solutions are needed.

SUMMARY OF THE INVENTION

The objective of the present invention is to provide an off-road vehicle and a control method thereof, which can effectively reduce safety hazards in the event of the failure of the driver to initially buckle, of safety belt disengagement during running of the off-road vehicle, and of safety belt sensor malfunction, thereby improving driving safety. The off-road vehicle includes a vehicle body, a plurality of wheels, one or a plurality of seats, a protective device, a suspension system, and a prime mover system. The plurality of wheels include one or a plurality of front wheels and one or a plurality of rear wheels. The seat(s), preferably including a driver seat and a passenger seat side by side, are arranged on the vehicle body. The protective device, having a fastened state and a disengaged state is supported by the vehicle body. The suspension system includes a front suspension and a rear suspension, with the front wheels connected to the vehicle body by the front suspension and the rear wheels connected to the vehicle body by the rear suspension. The prime mover system supported by the vehicle body is used to provide power to the off-road vehicle, with at least one of the front wheels or the rear wheels driven by the prime mover system. The prime mover system at least includes a power source. The off-road vehicle further includes a control module for controlling the operation of the power source at least in part, a vehicle velocity detection module, and an interaction module. The velocity detection module is capable of detecting the vehicle velocity and communicating with the control module. The interaction module is capable of communicating with the control module and is capable of providing information to a user of the off-road vehicle. When the off-road vehicle is in a preset state, the control module allows the power source to operate at a rotational speed up to a maximum rotational speed that the power source can support. When the protective device is in the disengaged state, the control module is capable of sending control commands to the interaction module causing the interaction module to provide at least one of a visual or auditory alert. When the protective device is in the disengaged state and depending upon the detected vehicle velocity, the control module may limit a power source rotational speed, with the limit value depending in part on the rotational speed of the power source at the time the disengagement of the protective device is identified and possibly depending in part on elapsed time since disengagement.

DETAILED DESCRIPTION

For better understanding of the above objects, features and advantages of the present disclosure, the embodiments of the present disclosure will be described in detail below with reference to the accompanying drawings. In the following description, numerous details are set forth in order to provide for better understanding of the present disclosure. However, the present disclosure may be implemented in many other ways different from those described herein, and those skilled in the art can make similar changes and improvements without departing from the teachings of the present disclosure. Therefore, the present invention is not limited by specifics of the embodiments disclosed below.

Figure 1:
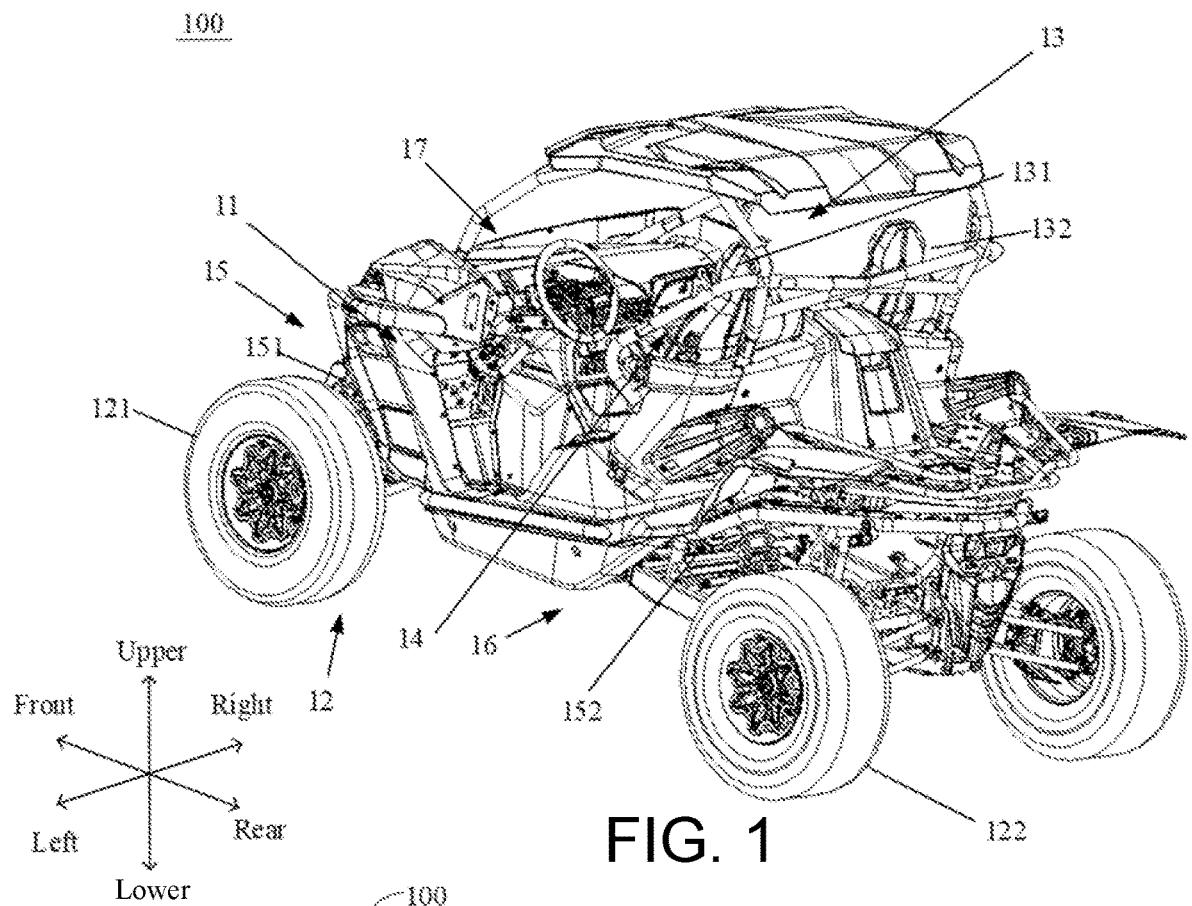
FIG. 1 is a perspective view of an off-road vehicle according to a preferred embodiment of the present invention.

The general orientations of front, rear, up (upper), down (lower), left and right for the off-road vehicle 100 are defined in FIG. 1.

The preferred off-road vehicle 100 includes a vehicle body 11, a plurality of wheels 12, a plurality of seats 13, a protective device 14, a suspension system 15, a prime mover system 16, and a control system 17. The plurality of wheels 12 include two front wheels 121 and two rear wheels 122. The plurality of seats 13 are supported by the vehicle body 11, and include a driver seat 131 and a passenger seat 132 side by side. The protective device 14 having a fastened state and a disengaged state is supported by the vehicle body 11. The protective device 14 is preferably a safety belt, but may alternatively or additionally be a vehicle door. The suspension system 15 includes a front suspension 151 and a rear suspension 152. The front wheels 121 are connected to the vehicle body 11 through the front suspension 151, and the rear wheels 122 are connected to the vehicle body 11 through the rear suspension 152. The prime mover system 16 is supported by the vehicle body 11 and is used to provide power for the off-road vehicle 100. The front wheels 121 and/or the rear wheels 122 are connected to the prime mover system 16 so as to be rotationally driven by the prime mover system 16. The prime mover system 16 includes a power source 161 (shown schematically in FIGS. 2 and 9), which may be an internal combustion engine or an electric motor. The control system 17 is used to control the operation of the off-road vehicle 100, which preferably includes an accelerator pedal (not shown). In other embodiments, the control system 17 includes a handlebar grip throttle control (not shown). In most embodiments, the control system 17 converts at least some mechanical control positions (such as the position of the accelerator pedal or handlebar grip throttle control) into an electrical signal (throttle by wire), though the present invention can alternatively be employed using direct mechanical controls of the power source 161.

Figure 2:
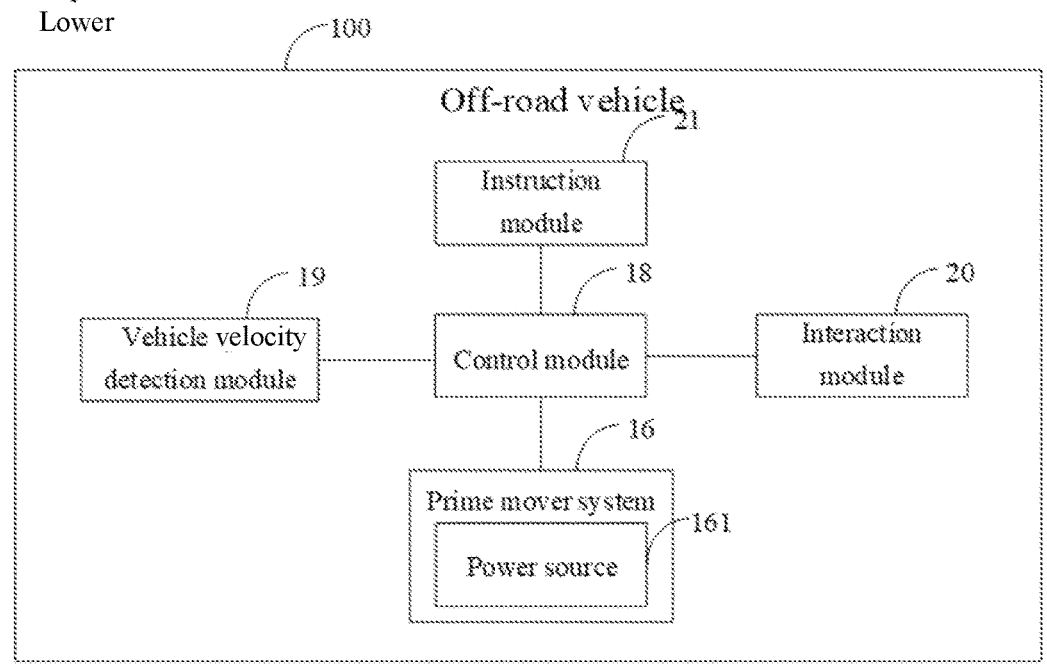
FIG. 2 is a system chart of the off-road vehicle.

As shown in FIG. 2, the off-road vehicle 100 further includes a control module 18, a speed or velocity detection module 19, and an interaction module 20. In the remainder of this specification, the term "velocity" will be used to refer to the speed or velocity at which the vehicle 100 travels (typically in km/h or mph, and not requiring a directional vector component), as distinguished from the rotational speed that the engine, motor, transmission, drive shaft or wheel component rotates (typically in rpm). The control module 18 is capable of at least in part controlling or limiting the operation of the power source 161, and the control module 18 may be a controller. The vehicle velocity detection module 19 is capable of detecting vehicle velocity and is capable of communicating with the control module 18, for example, the vehicle velocity detection module 19 may be a sensor which measures transmission or transaxle output or wheel rotational speed used to determine vehicle velocity, or other type of vehicle velocity sensor. The interaction module 20 is capable of communicating with the control module 18 and is capable of providing visual or audio information to a user of the off-road vehicle 100. For example, the interaction module 20 may be a display screen, where icons can be displayed to provide information to the user. The interaction module 20 may be an indicator light or a speaker that provides information in the form of light or sound. The protective device 14 and/or a separate sensor (not shown) for the protective device 14 can also provide a signal to the control module 18 to indicate whether the protective device 14 is engaged or disengaged.

In the preferred embodiment, when the off-road vehicle 100 is started it is initially in a preset state, in which the control module 18 allows the power source 161 to operate up to a high rotational speed. For instance, the high rotational speed may be equal to the maximum rotational speed that the power source 161 can support.

The detected vehicle velocity is in part used to determine whether the off-road vehicle 100 is in a moving or generally stationary state. For instance, the determination of whether the vehicle is moving or generally stationary may be split by a value of 5 km/h (or 3 mph). When the detected velocity of the off-road vehicle 100 is equal to or greater than 5 km/h, the off-road vehicle 100 is considered to be moving. If the detected velocity of the off-road vehicle is less than 5 km/h, it is considered that the vehicle is stationary or nearly stationary. Whenever the vehicle is generally stationary, the control module 18 preferably stays in the preset state allowing full response of the power source 161.

As one example, consider the situation where the vehicle 100 has gotten stuck in rough terrain, against an obstacle, in mud, etc. The driver may wish to exit the vehicle 100, once or several times, to inspect the situation causing the vehicle 100 to be stuck. So long as the vehicle 100 is stuck and therefore remains stationary or nearly stationary, the control module 18 stays in the preset state and allows the driver full throttle control over the power source 161 such as by pushing on the accelerator pedal—even though the protective device 14 is disengaged. This differs from certain prior art solutions which limit performance of the vehicle at all times that the protective device is disengaged.

Worse yet, consider the situation where the vehicle 100 has gotten stuck, and in so doing has caused the protective device sensor to malfunction and provide a disengaged signal to the control module 18 even when the protective device 14 is engaged. For instance, imagine the driver drove the vehicle 100 (perhaps "crashed" the vehicle 100 would be more accurate) so both front wheels 121 fell into a rock crevasse almost as wide and deep as the front tire diameter, damaging the protective device sensor. The rock crevasse is likely to be at a remote location without ready towing or repair capabilities. In that situation, certain prior art solutions (which attempt to prevent or restrict unbuckled driving) may limit performance of the vehicle in a way which completely prevents the driver from getting the vehicle unstuck. That is, certain prior art solutions may in certain situations in fact cause the stranding of the driver at a remote location without ready towing or repair capabilities. In contrast, the present invention allows full rotational speed capabilities of the vehicle 100—regardless of engaged/disengaged status of the protective device 14—as long as the vehicle 100 is considered stationary or nearly stationary.

Another situation involves using the vehicle's maximum low velocity towing capacity, such as using a tow chain (not shown) to rip a stump (not shown) from the ground. The driver may wish to exit the vehicle 100, once or several times, to inspect and/or adjust the tow chain. The present invention allows the driver to use the full rotational speed capabilities of the power source 161—even if not engaging the protective device 14 each time upon reentering the vehicle 100—as long as the vehicle 100 is considered stationary or nearly stationary. Many prior art solutions are not so accommodating.

In the preferred embodiment, the protective device 14 is a safety belt mounted on the driver seat 131. When the off-road vehicle 100 is moving, if the safety belt 14 is in the fastened state, then the power source 161 remains in the preset state, i.e., allows the power source 161 to respond to an accelerator pedal stroke at any rotational speed not exceeding the maximum rotational speed that the power source 161 can support. For example, in the preferred vehicle 100 shown in FIG. 1, the maximum rotational speed that the power source 161 can support may be 7600 rpm or 7800 rpm.

Whenever the off-road vehicle 100 is running and the safety belt 14 is in the disengaged state, the control module 18 is capable of sending control commands to the interaction module 20. The interaction module 20 responds to the control commands by providing at least one of a visual alert or an auditory alert. For example, in the case of safety belt disengagement, the interaction module 20 timely reminds the user of the situation of safety belt disengagement, by an audible alarm generated by a speaker and/or via a notification on the display screen.

In addition to using sensed velocity to determine whether the vehicle 100 is moving or generally stationary, the preferred control module 18 uses sensed velocity to determine whether the vehicle 100 is moving slow or fast. Fast motion is generally considered a velocity at or above which an accident is likely to cause serious or fatal injuries, while slow motion is generally considered a velocity below which an accident is unlikely to cause serious or fatal injuries. So long as the vehicle 100 has not yet begun fast motion, the control module 18 may keep the vehicle 100 in the preset state with full driver control over the power source 161 even while the safety belt 14 is in the disengaged state. Different vehicles may have different slow/fast velocity thresholds; for instance, a child's vehicle may have a lower value for its slow/fast velocity threshold than an adult's vehicle, and a racing vehicle may have a higher value for its slow/fast velocity threshold than a work vehicle. However, in most embodiments the slow/fast velocity threshold will be in the range of 16 km/h (10 mph) to 40 km/h (25 mph). For instance, the slow/fast velocity threshold may be 16 km/h, 20 km/h, 30 km/h or 40 km/h, or any value from 16 km/h to 40 km/h.

As soon as a driver without an engaged seatbelt 14 reaches a fast velocity, the preferred control module 18 begins restricting performance of the power source 161 to be at or below a controlled rotational speed value. Thereafter, even if the unbelted driver tries to fully open the throttle (e.g., floors the accelerator pedal), the power source 161 is still kept below the controlled rotational speed value. The controlled rotational speed value is lower than the high rotational speed value, preferably less than ⅔rds of the high rotational speed value. In most embodiments, the controlled rotational speed value will roughly correspond with the slow/fast velocity threshold. Therefore, the controlled rotational speed value selected by the system designer is likely to be different for vehicles with different engine displacements (having different amounts of torque and different acceleration curves delivered at any given rotational speed).

For example, the controlled rotational speed value for one off-road vehicle 100 with a displacement of 1000 ccs is 3900 rpm, used with a corresponding slow/fast velocity threshold of 20 km/h. At flat and smooth road conditions at sea level, 3900 rpm for this vehicle 100 corresponds to a steady state (i.e., neither accelerating nor decelerating) velocity of 24 km/h. Uphill, downhill, acceleration, deceleration, vehicle weight, engine displacement or other conditions may change the correspondence between the controlled rotational speed of the power source 161 and vehicle velocity. But in general, if the vehicle exceeds 20 km/h with an unbuckled driver, the control module 18 will thereafter begin to limit the power source 161 to 3900 RPM. In some embodiments, the control module 18 may attenuate the throttle by wire signal received from the accelerator pedal to achieve the rotational speed control, i.e., any accelerator pedal position signal which otherwise would cause the power source 161 to rotate faster than 3900 rpm is reduced by the control module 18 to a throttle by wire signal which produces 3900 rpm. The power source rotational speed is directly controlled rather than limiting the vehicle velocity, reducing safety hazards in the event of an unbuckled driver while achieving more intuitive and normal vehicle performance. For instance, the vehicle 100 with an unbelted driver will still travel more slowly uphill than downhill, and the preferred control methods will never brake the vehicle 100 to the surprise of the driver. The safety of the unbuckled driver is thus better ensured than with other prior art solutions including strict speed control.

Now we consider the situation where the driver becomes unbuckled while the vehicle is already moving. If the first unbuckled sensing occurs when the vehicle 100 is considered stationary or nearly stationary, the vehicle 100 still maintains complete performance with the power source 161 only limited to its maximum rotational speed. If the first unbuckled sensing occurs when the vehicle 100 is considered moving slowly, the power source 161 is still only limited to its maximum rotational speed until the driver accelerates to begin moving fast. However, if the first unbuckled sensing occurs when the vehicle is already considered to be moving fast, then there is a likelihood that the power source rotational speed is already greater than the controlled rotational speed value. If so, we do not want to abruptly change any driving characteristics, and instead want to safely slow the vehicle 100 back to a safer condition. The control module 18 is capable of controlling the power source 161 to gradually reduce the rotational speed until the power source rotational speed does not exceed the controlled rotational speed value, such as reducing from the maximum rotational speed (for some embodiments, from 7800 rpm) to the controlled rotational speed (for some embodiments, to 3900 rpm) over a time frame between three seconds and one minute, and more preferably over a time frame between five and thirty seconds. Note that the rotational speed reduction may occur more quickly if the driver controls the vehicle to reduce rotational speed, such as by fully pulling off the accelerator pedal. The speed reduction also preferably can be achieved more quickly if the rotational speed is not so high at the time of first unbuckled sensing. For instance, if the driver has the engine at 4300 rpm at the time of buckling, then the reduction to a rotational speed of 3900 rpm (or less, if the driver pulls off the accelerator pedal) can occur over a time frame shorter than three seconds, such as over a time frame of two seconds. These time frames help ensure that any unexpected slowing of the vehicle 100 occurs gradually and safely. In any specific embodiment, how to obtain the gradual and safe slowing of the rotational speed limiting of the off-road vehicle 100 depends upon the mechanism chosen for providing the rotational speed control. For instance, in the preferred embodiment, the control module 18 controls the power source 161 by attenuating the throttle by wire signal to reduce the rotational speed by a gradient of at least 20 rpm every 100 ms (or more if the driver more quickly pulls off the accelerator pedal), until the rotational speed does not exceed the controlled rotational speed value. In some embodiments, the attenuation of the throttle by wire signal may initially begin slowly (such as having no change in rpm during the first 100 ms after unbuckling, having a reduction of 5 rpm during the second 100 ms after unbuckling, etc.), in order to minimize any jerk perceived by the driver or passenger after driver unbuckling. In all situations, the forced reduction to at or below the controlled rotational speed value occurs without use of the vehicle brakes to surprisingly slow the vehicle 100. In most situations when not traveling down a steep hill, the forced reduction to at or below the controlled rotational speed value occurs without use of engine braking to unnaturally slow the vehicle 100. A safe transition to a controlled rotational speed (which is less than the high rotational speed) while unbuckled is an important aspect of the present invention.

Once the control module 18 begins limiting the power source rotational speed to be at or below the controlled rotational speed value, the preferred embodiment uses an instruction module 21 shown in FIG. 2 to inform the driver of that fact. For instance, the display may show a written indication of "Engine performance limited while unbuckled" or light, color and/or flash an icon of the same meaning to try and prompt the driver to buckle up. One alternative embodiment has the instruction module 21 issue an audible verbal command, such as "Please buckle the driver's seat belt". Another alternative embodiment changes the alarm sound from a mere unbuckled reminder beep to a more alarming and loud sound. In some embodiments, the interaction module 20 is used to inform the driver that power source rotational speed is being limited to at or below the controlled rotational speed value, and the instruction module 21 as a separate component is omitted from the vehicle 100.

Once the control module 18 begins limiting the power source rotational speed to be at or below the controlled rotational speed value, if the safety belt is switched to the fastened state, then the control module 18 sets the power source rotational speed control back to the preset state, i.e., allowing the power source 161 to follow throttle control up to the maximum rotational speed that the power source can support. That is to say, when the driver buckles or rebuckles, the power source 161 is only limited to, for example, 7600 rpm or 7800 rpm.

The preferred embodiment also allows a second way for the driver to return the control module 18 to the preset state. Once the control module 18 begins limiting the power source rotational speed to be at or below the controlled rotational speed value, if the driver slows the vehicle 100 to be stationary or nearly stationary (such as 5 km/h (3 mph) or less in the preferred embodiment), the control module 18 will reenter the preset state even if the driver remains unbuckled. Alternative embodiments use a different safety threshold, such as up to 10 km/h (6 mph), or use the different safety threshold differently in the control scheme (some alternative embodiments discussed below). Once the vehicle 100 slows to below the safety threshold, the preferred control module 18 will allow the power source rotational speed (under accelerator pedal control) to accelerate up to its maximum rotational speed (while remaining at slower than the slow/fast velocity threshold) even if the driver remains unbuckled. The safety threshold should be significantly lower than the slow/fast threshold, such as 70% or less than slow/fast threshold. By having the safety threshold significantly lower than the slow/fast threshold, the likelihood of toggling back and forth between limited RPMs and full throttle control is largely eliminated. For instance using the preferred values, the vehicle 100 while limited to 3900 RPMs is likely to either a) have the accelerator pedal pushed at or beyond what would otherwise produce 3900 RPMs, and so be travelling at 3900 RPMs and at a velocity in excess of 10 km/h (6 mph), or b) have the accelerator pedal released or only slightly pushed to a position that produces significantly less than 3900 RPMs, so when the vehicle 100 slows to 10 km/h the controlled rotational speed value is released without immediate change in vehicle response. That is, the present invention avoids any safety hazards of instantaneous release of the controlled rotational speed value back to the preset state.

The present invention thus performs neither a strict velocity limit control of the vehicle 100 nor a strict rotational speed control of the power source 161. Instead the present invention includes selected aspects of both velocity limit control and rotational speed control to better ensure safety of unbuckled drivers and passengers in a wider variety of situations where either strict velocity limit control or strict rotational speed control could lead to adverse consequences.

Figure 3:
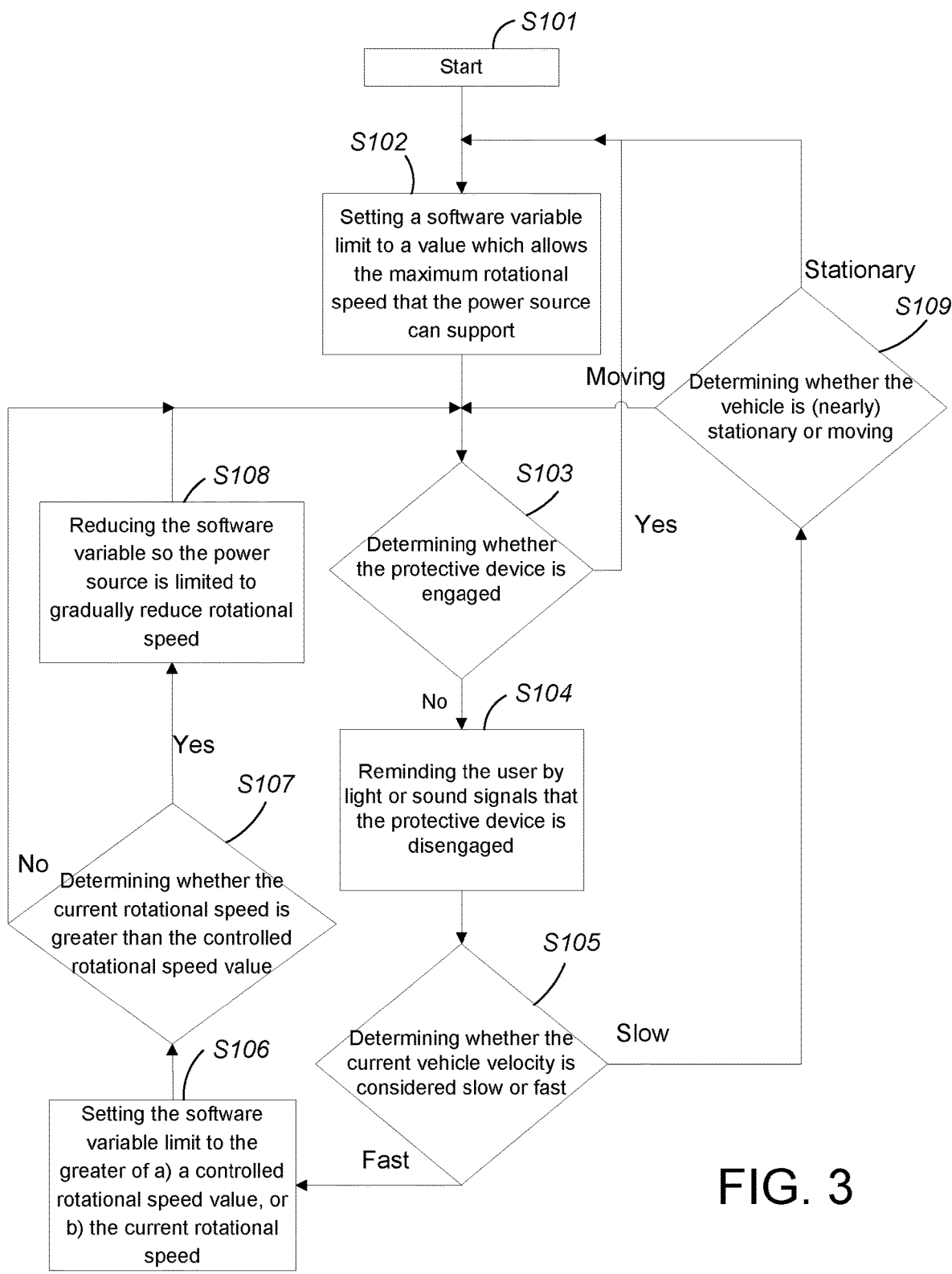
FIG. 3 is a flowchart of a control method for the off-road vehicle according to a first embodiment of the present invention.
Figure 4:
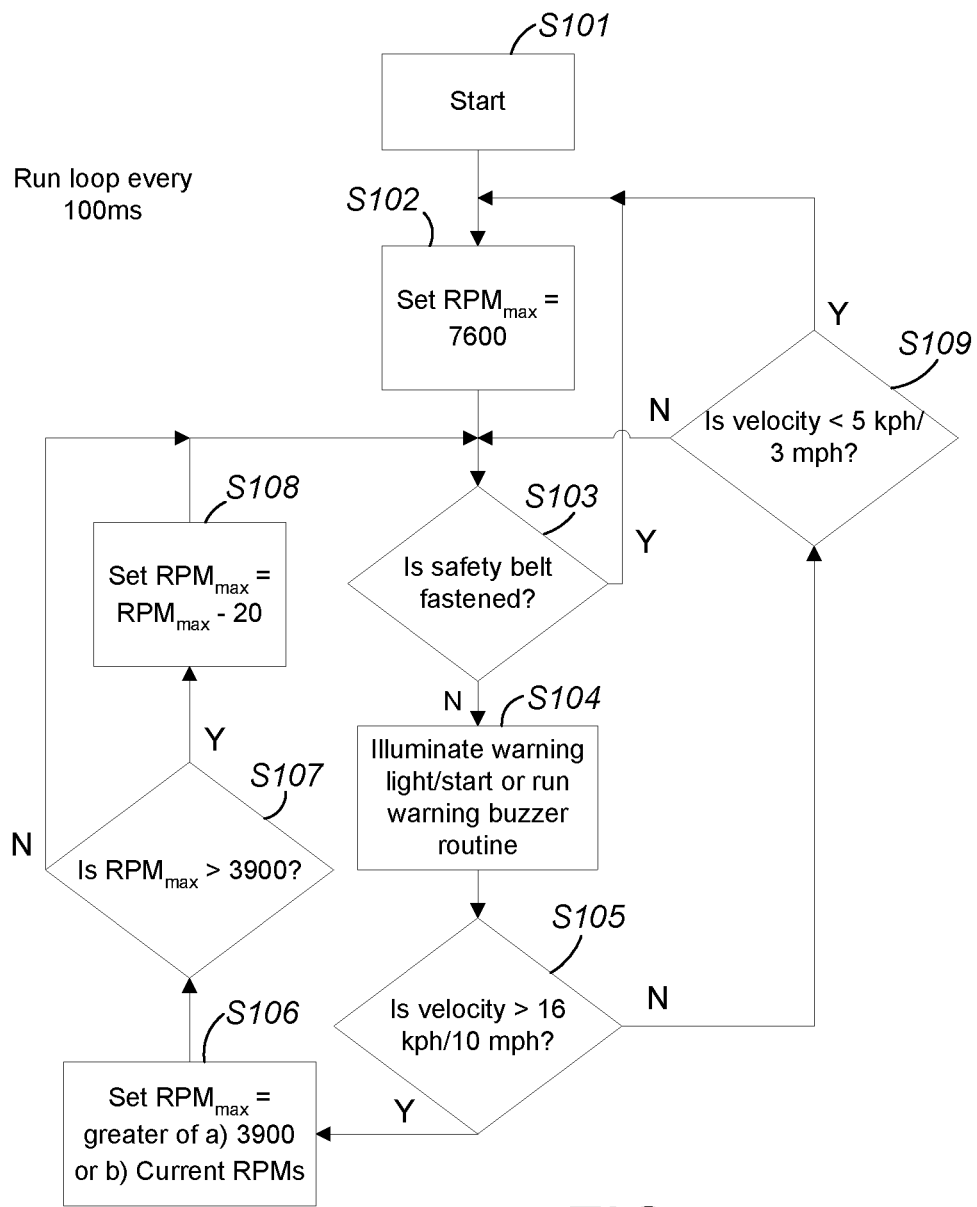
FIG. 4 is a more specific version of the flowchart of FIG. 3 showing values for the first embodiment of the invention.

In many embodiments of the present invention, the control module 18 includes a controller which follows software or firmware instructions to adjust or provide electrical signals in the vehicle 100. FIGS. 3 and 4 show software/firmware control logic flow charts of the preferred limit control method, with FIG. 3 being more general and FIG. 4 using specific preferred values. FIGS. 5-8 all show software/firmware control logic flow charts of alternative embodiments. The control method can be performed in a loop at regular intervals after powering the off-road vehicle and/or starting the rotation of the power source 161, with the preferred embodiment running the loop every 100 ms. The 100 ms loop interval depends in part on the hardware of the controller, and other embodiments can use different loop intervals with some of the values mentioned above or below being correspondingly adjusted. The control method includes the following steps:

S101: starting the first loop;

S102: initialize the preset state by setting a rotational speed maximum to allow any speed that the power source 161 can support. For instance, the software/firmware may include a variable (in the preferred embodiment, this variable is named "$RPM_{max}$"), and the initialization of step S102 sets the value of this $RPM_{max}$ variable in the software to 7600 or 7800 rpm. While $RPM_{max}$ has a value of 7600, the control device 18 allows the power source 161 to rotate at any speed less than or equal to 7600 rpm without interfering and/or modifying the throttle signal from the accelerator pedal;

S103: determining whether the protective device (safety belt 14) is in an engaged (fastened) state; if the safety belt is in the fastened state, then returning to S102 for the next loop; if the safety belt is in a disengaged state, then performing S104;

S104: reminding the user by an interaction module 20 utilizing signals in the form of light or sound indicating that the safety belt 14 is in a disengaged state;

S105: determining whether the currently detected vehicle velocity is faster than a slow/fast threshold selected by the system designer. In the most preferred embodiment, the slow/fast threshold is 16 km/h or 10 mph; other embodiments use a different value for the slow/fast threshold, and the value of the slow/fast threshold selected by the system designer may depend upon the specific vehicle and/or conditions of use. For instance, the slow/fast threshold may be selected to be slower if the vehicle 100 is being used for rental purposes, or if the vehicle 100 will be driven on tight trails with narrow clearance through trees. Similarly, the system designer may select a higher slow/fast threshold for a vehicle 100 with a low center of gravity than for a vehicle with a higher center of gravity (which could tip or begin to tip and throw the driver at a lower velocity). If the vehicle 100 is considered to be traveling fast, then performing S106, if not, then performing S109;

S106: controlling the power source 161 to limit rotational speed, such as by setting the value of the $RPM_{max}$ variable in the software to be the greater of a controlled rotational speed value (such as 3900 rpm) and the currently detected rpms (such as by beginning to attenuate a throttle by wire signal);

S107 and S108: if the detected rotational speed is greater than the controlled rotational speed value, then gradually and safely reducing the power source rotational speed. For example, determining in S107 if the current rotational speed is greater than 3900 rpm (but less than 7600 or 7800 rpm), likely because the driver unbuckled while traveling fast; if so, then performing S108, where S108 reduces the value of the $RPM_{max}$ variable in the software by a gradual amount, such as about 200 rpm per second or 20 rpm per 100 ms loop, (and/or increasing attenuation of the throttle by wire signal an equivalent amount) before returning to S103 for the next loop; if not, then directly returning to S103 for the next loop; and S109: determining whether the vehicle 100 is stationary or nearly stationary, such as whether current vehicle velocity is less than 5 km/h or 3 mph if so, then returning to S102 for the next loop (which will return $RPM_{max}$ to the preset state), if not, then returning to S103 for the next loop.

Figure 5:
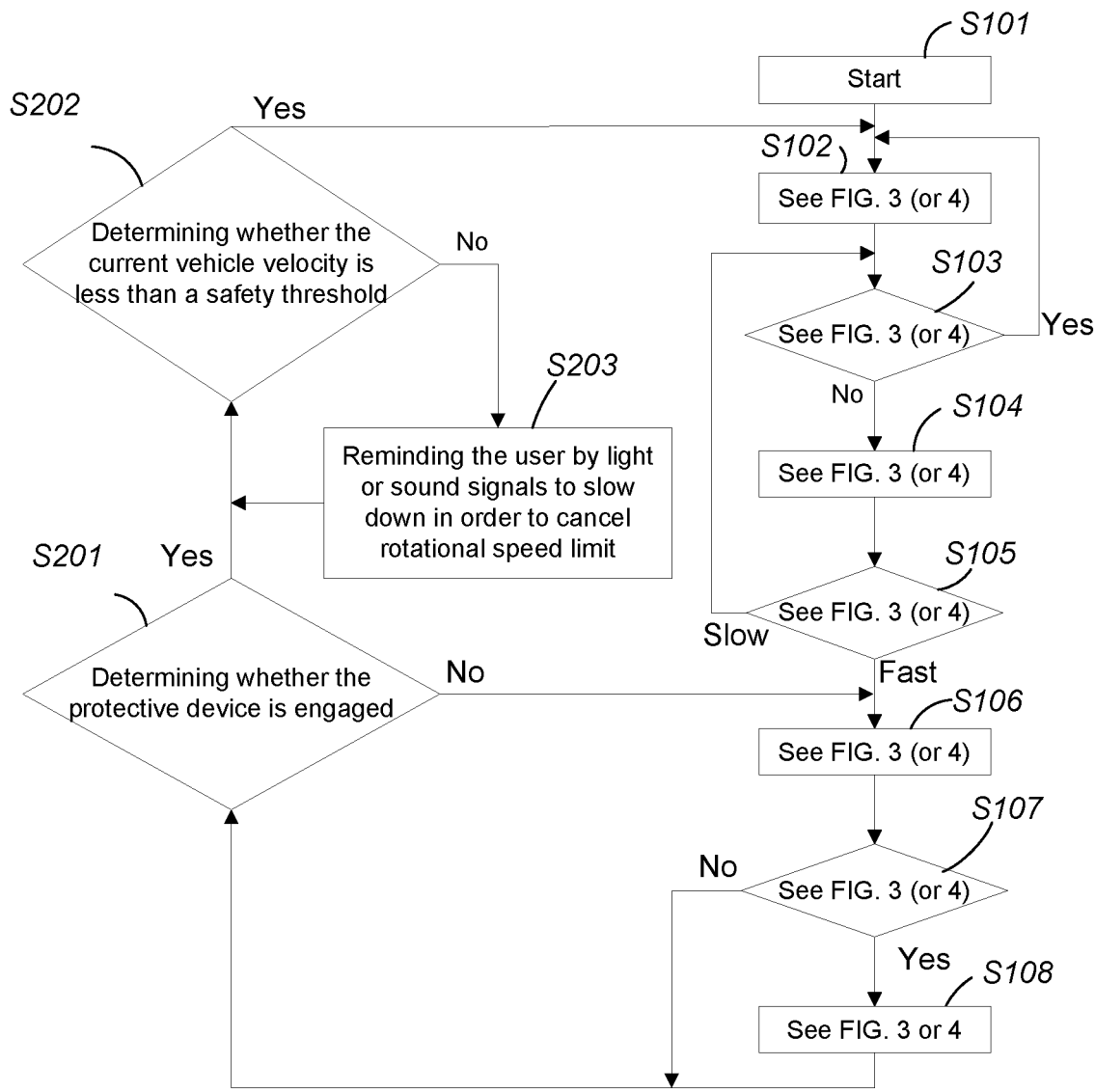
FIG. 5 is a flowchart of a control method for the off-road vehicle according to a second embodiment of the present invention.

FIG. 5 shows a logic diagram for an alternative embodiment. In the embodiment of FIG. 5, there is no possibility of returning to the preset state just by slowing the vehicle 100 to be stationary or nearly stationary. Instead, after limiting of the power source 161 to the controlled rotational speed value has begun, the driver must BOTH a) engage or reengage the protective device 14, AND b) slow the vehicle 100 down below a safety velocity threshold. The safety velocity threshold could be the same as the stationary/nearly stationary threshold from the embodiment of FIGS. 3 and 4, but more preferably is greater than the stationary/nearly stationary threshold from the embodiment of FIGS. 3 and 4. Thus, the limit control methods of FIG. 5 differ from those of FIGS. 3 and 4 by replacing step S109 with steps S201, S202, and S203. As shown in FIG. 5, the control method includes the following steps of S101-S108: same as for FIG. 3, except that if the velocity determined in step 105 is considered slow, the logic always returns to step S103 (rather than possibly to step S102 through step S109) for the next loop;

S201: determining whether the protective device (safety belt 14) is in an engaged (fastened) state (for a second time during the initial unfastened loop); if so, then performing S202, if not, then returning to step S106 for the next loop;

S202: determining whether the current vehicle velocity is less than a safety threshold, if so, then returning to performing S102 (resetting to preset state) for the next loop, if not, then performing S203; and S203: reminding the user by an instruction module 21 utilizing signals in the form of light or sound indicating, since the safety belt is fastened but the vehicle has not sufficiently slowed, that the rotational speed limit will not be cancelled unless the driver further slows down.

The embodiment of FIGS. 3 and 4 can be considered better than the embodiment of FIG. 5 because it causes little to no delay for the driver if they buckle as soon as the controlled rotational speed value is in force, rather than forcing the driver to slow down despite immediate buckling and/or rebuckling. On the other hand, the embodiment of FIGS. 3 and 4 could be considered to have a detriment of causing driver reliance on the vehicle 100 telling the driver to buckle rather than have the driver initiate buckling themselves. What percentage of drivers would develop such a tendency to rely on the vehicle 100 to inform the driver prior to buckling up is unknown. The embodiment of FIG. 5 is thus considered better than the embodiment of FIGS. 3 and 4 in teaching the drivers themselves to be mindful of their safety belt 14 whenever they intend or think it likely to drive the vehicle 100 at high velocities rather than rely entirely on the vehicle's safety system.

Figure 6:
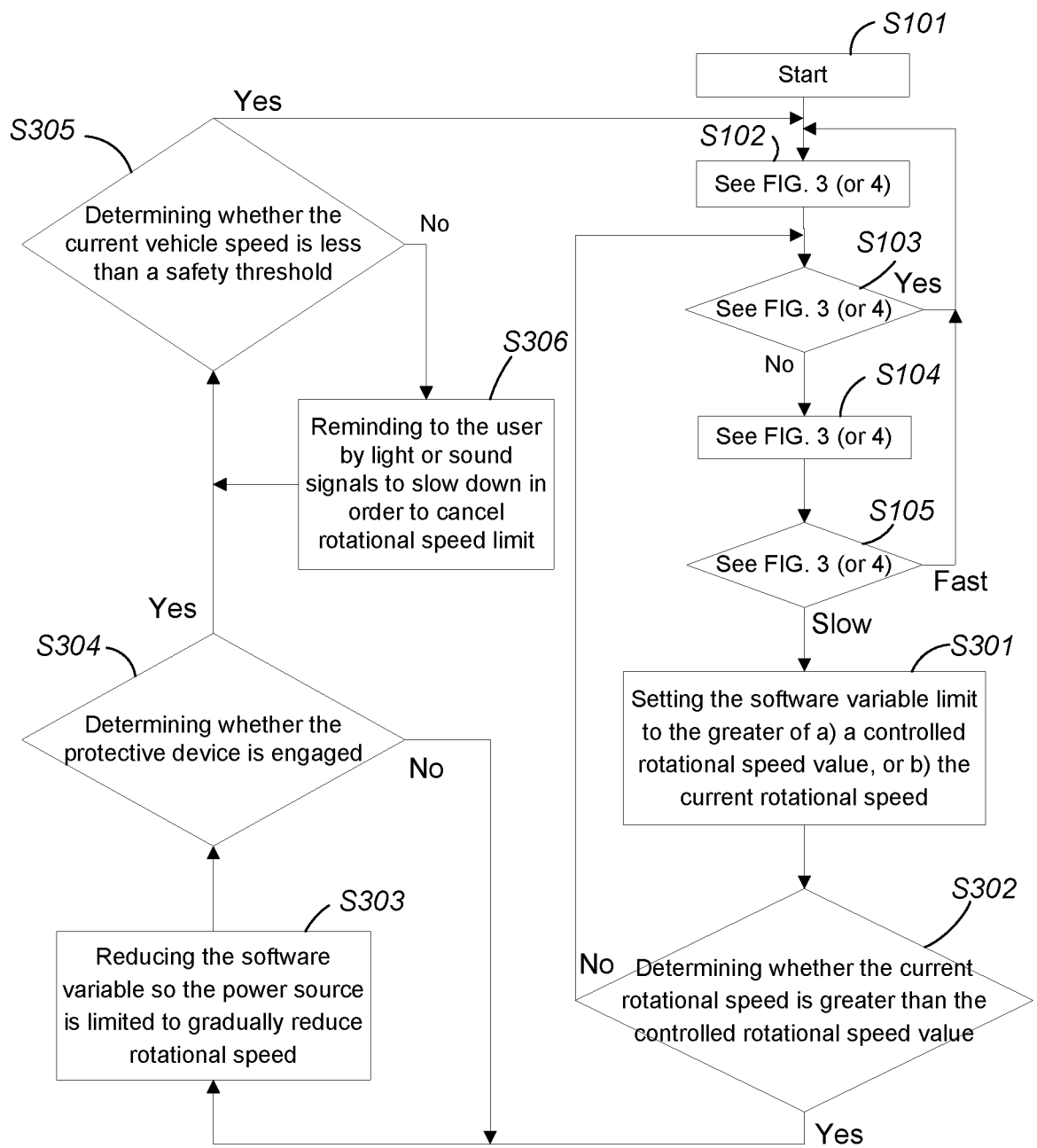
FIG. 6 is a flowchart of a control method for the off-road vehicle according to a third embodiment of the present invention.

Both the embodiment of FIGS. 3 and 4 and the embodiment of FIG. 5 will cause gradual and safe slowing of the vehicle 100 should the driver unbuckle when traveling at high velocity. For certain unusual situations and certain users who want to be able to intentionally unbuckle at high velocities (such as for taking off one's coat during a long road race), this may be viewed as overly limiting. FIG. 6 shows a logic flowchart of a third embodiment that avoids this possible detriment. Thus, in the embodiment of FIG. 6, limiting to the controlled rotational speed value will only be engaged so long as the safety belt has been determined to be unfastened WHILE EITHER STOPPED OR TRAVELING AT A SLOW VELOCITY. If the protective device is in the disengaged state and the off-road vehicle 100 is traveling fast, then the control module 18 allows the power source rotational speed to follow the accelerator pedal stroke to any rotational speed that the power source can support.

The embodiment of FIG. 5 includes another different aspect, covering situations when the driver first becomes unbuckled while both traveling at a slow velocity and revving the power source 161 above the controlled rotational speed value. For instance, this situation might arise if the driver is trying to get the vehicle unstuck or pulling a stump AND becomes unbuckled in the middle of the process. Alternatively, this situation might arise if the slow/fast threshold is selected to be higher relative to the controlled rotational speed value, and the vehicle is traveling just slower than the slow/fast threshold. In those situations, it is presumed that the driver intended to be buckled and unbuckled mistakenly. The control logic will continue to slow the rotational speed all the way to zero unless the driver rebuckles, and will not reset unless the driver has both rebuckled and slowed the vehicle 100 to a velocity lower than a safety threshold.

As shown in FIG. 6, the control method includes the following steps of

S101-S105: same as for FIG. 3, except that if the velocity determined in step 105 is considered fast, the logic returns to step S102 (resetting to the preset state) for the next loop; if not continuing to step S301;

S301: limiting a power source rotational speed to not exceed a rotational speed threshold. The rotational speed threshold in step 301 will be generally selected at a value which powers the vehicle at a steady state considered slow, for instance, if the slow/fast determination is at 40 km/h (25 mph), the rotational speed threshold might be selected at 3900 rpm, whereas if the slow/fast determination is at 16 km/h (10 mph), the rotational speed threshold might be selected at 2000 rpm. By having a correct correspondence between the rotational speed threshold and the slow/fast determination, it is unlikely or impossible that the driver can initially accelerate the vehicle 100 to a fast velocity without initially being buckled;

S302: determining whether the current rotational speed is greater than the rotational speed threshold, for example, greater than 3900 rpm, if not, then returning to S103 for the next loop, if so, then performing S303;

S303: controlling the current power source rotational speed to gradually reduce rotational speed;

S304: determining whether the safety belt is in a (re) fastened state; if so, then performing S305, if not, then returning to S303 for the next loop;

S305: determining whether the current vehicle velocity is less than a safety threshold, if so, then returning to S102 for the next loop, if not, then performing S306; and S306: reminding the user by an instruction module 21 utilizing signals in the form of light or sound indicating that the vehicle 100 needs to reduce velocity before the rotational speed limit will be cancelled.

In all the above embodiments, the vehicle 100 can always be driven by an initially unbuckled driver with the power source 161 operating at or below the controlled rotational speed value. This fact is considered very important in many situations: even for instance if the protective device sensor malfunctions in a remote location, the vehicle can usually limp home so the protective device sensor can be repaired in a garage. In certain situations, the limp home benefit may have little or no benefit compared to enforcing a rule that the vehicle 100 not be driven at high velocities without utilizing the protective device 14. For instance, the vehicle 100 may be used for rental purposes, only within a boundary (such as a track or an ORV park) where the rental company can always quickly reach and repair or reset the vehicle 100.

Figure 7:
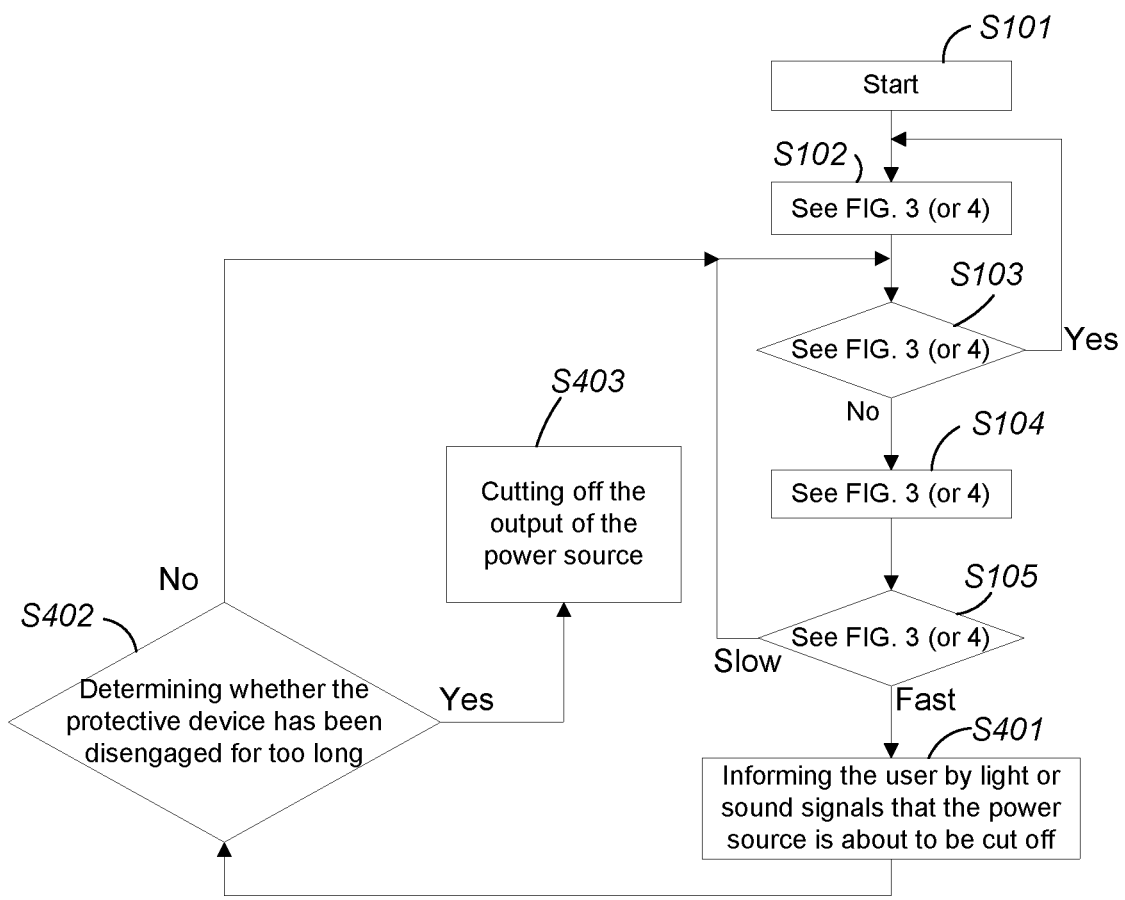
FIG. 7 is a flowchart of a control method for the off-road vehicle according to a fourth embodiment of the present invention.

FIG. 7 shows the logic software/firmware logic flowchart of an embodiment ideal for those situations. If the driver is always belted or the unbelted driver only drives the off-road vehicle 100 slowly, then the rotational speed control is never initiated. However, if the off-road vehicle 100 is ever driven fast by an unbelted driver, then the control module 18 first warns the driver and then after a certain period of time completely cuts off the power output of the prime mover system 16. The danger of an unbelted rental customer driving the vehicle at high-velocity is reduced by completely cutting off the output of the prime mover system, whereafter rental company employees can then easily arrive at the stopped vehicle and scold the rental customer for high-velocity unbelted driving which is not permitted under the rental company rules. As shown in FIG. 7, the control method includes the following steps of:

S101-S105: same as for FIG. 3, except that if the velocity determined in step S105 is considered slow, the logic always returns to step S103 for the next loop;

S401: reminding the user by an interaction module 20 or an instruction module 21 utilizing signals in the form of light or sound to indicate that the power source 161 is about to be cut off;

S402: determining that, since the alarm of S401 was first initiated, whether the safety belt 14 has remained disengaged state for a certain period of time and yet the vehicle 100 is still being driven fast; if so, then performing S403, if not, then returning to S103 for the next loop; and S403: cutting off the output of the power source 161.

Figure 8:
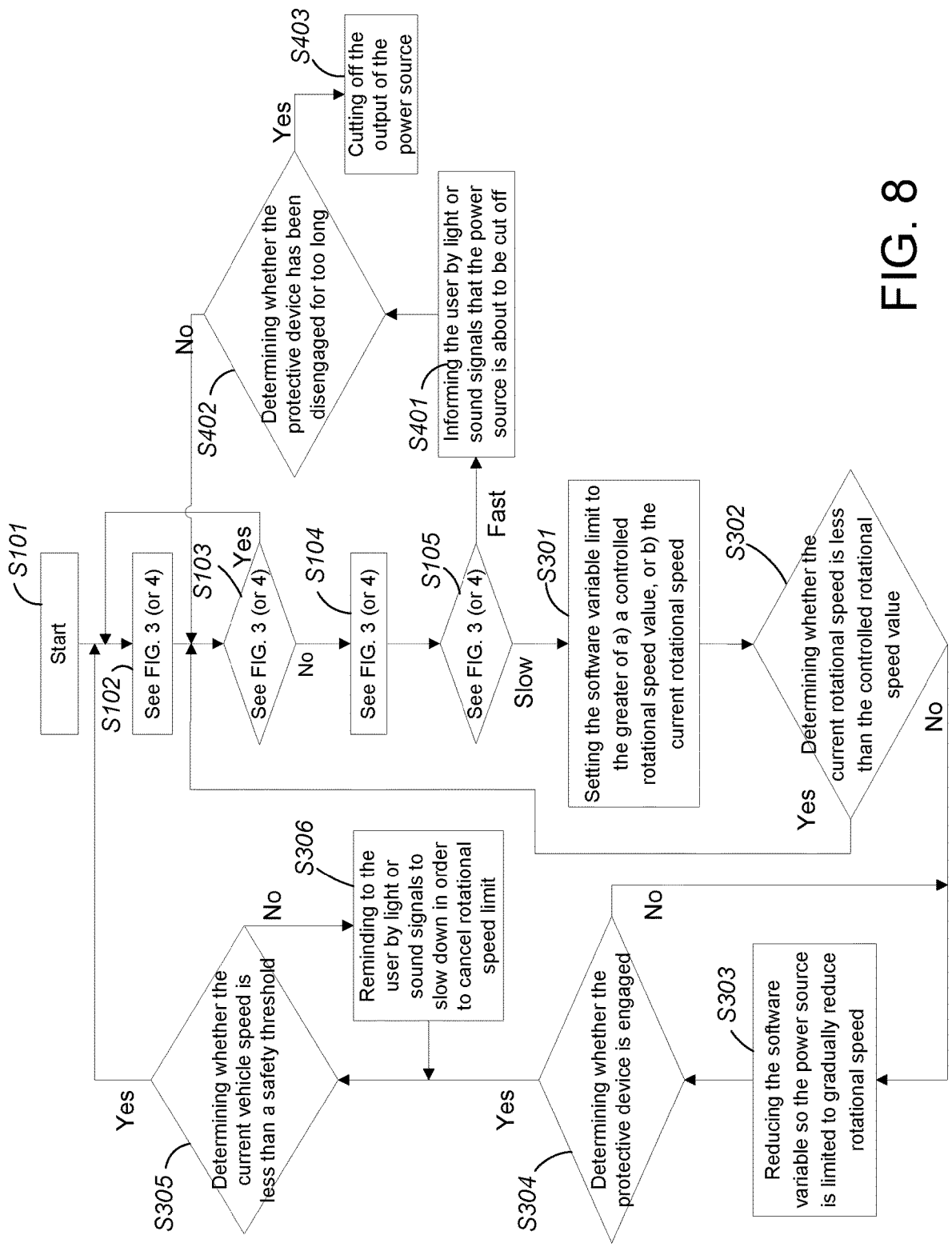
FIG. 8 is a flowchart of a control method for the off-road vehicle according to a fifth embodiment of the present invention.

The above embodiments all emphasize different features of the present invention, which can be used individually or in combination. For instance, FIG. 8 represents an embodiment which combines both the features of the embodiment of FIG. 6 and the features of the embodiment of FIG. 7. Many other combinations are similarly possible, keeping in accordance with the objects of the present invention.

Figure 9:
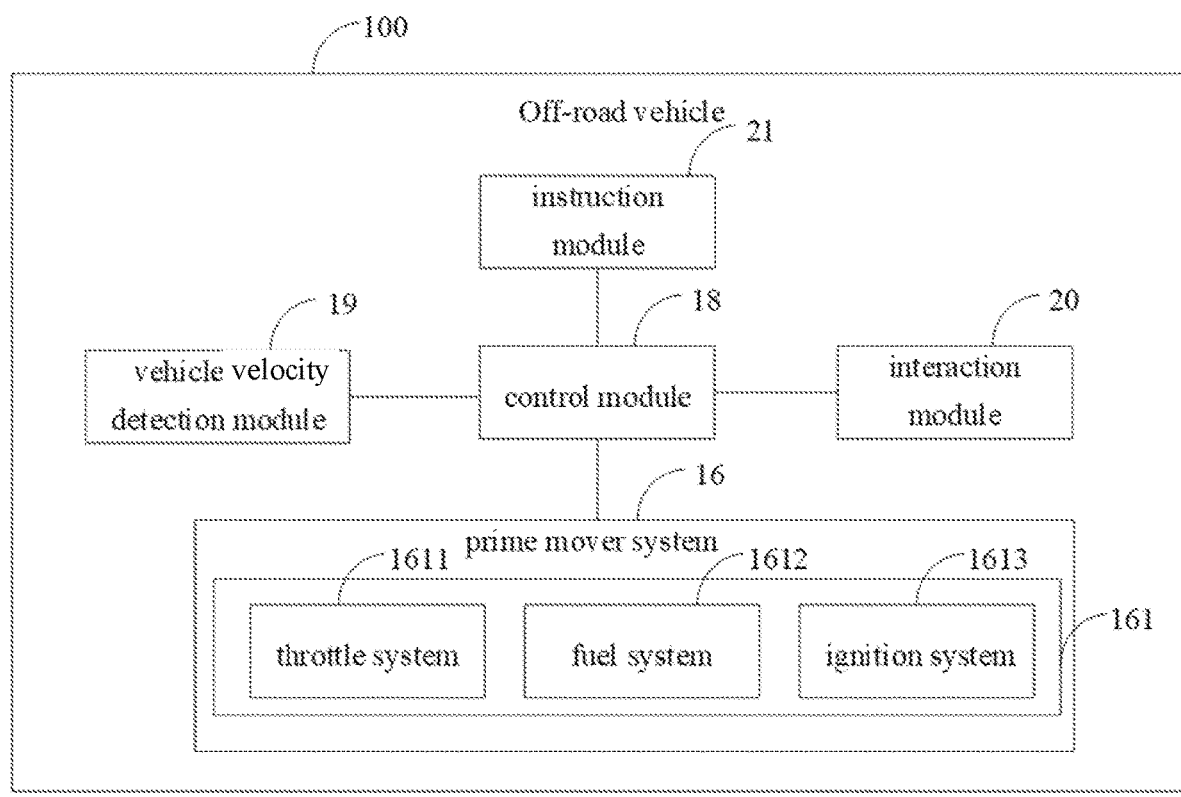
FIG. 9 is another system chart of the off-road vehicle.

FIG. 9 shows a schematic to provide more detail to the preferred power source 161. In FIG. 9, the power source 161 is an internal combustion engine. The engine includes a throttle system 1611, a fuel system 1612, and an ignition system 1613. The control module 18 controls rotational speed beneath the controlled rotational speed value or cuts off the power output of the prime mover system 16 by at least one of the following: controlling the throttle system 1611 to reduce or stop air supply, controlling the fuel system 1612 to reduce or stop fuel supply, or controlling the ignition system 1613 to adjust or stop generating electric sparks. In some embodiments, more than one of these options are simultaneously used. In some preferred embodiments, when it is necessary for instance to reduce the power source rotational speed to 3900 rpm, the operation may be reducing the air inflow of the throttle system 1611 firstly, and if the current power source rotational speed is much greater than 3900 rpm (e.g. 5000 rpm) after reducing the air inflow of the throttle system 1611, the control module 18 will thereafter control the ignition system to stop or reduce the generation of electric sparks to reduce the torque of the power source 161. Alternatively, when it is necessary to reduce the current power source rotational speed to 3900 rpm, the operation may first control the ignition system to stop or reduce the generation of electric sparks so as to reduce the rotational speed to 4500 rpm or 5000 rpm, and then reduce the air inflow of throttle system 1611 until the rotational speed does not exceed 3900 rpm, which can quickly reduce the power source rotational speed to the controlled rotational velocity value in a short (but safe) period of time.

The above-mentioned embodiments only represent several embodiments of the present invention, and the descriptions thereof are specific and detailed, but should not be construed as a limitation on the scope of the invention. Workers of ordinary skill in the art may make numerous modifications and improvements without departing from the concepts of the present invention.

What is claimed is:

1. An off-road vehicle comprising
a vehicle body;
a plurality of wheels comprising a pair of front wheels and a pair of rear wheels;
at least one seat arranged on the vehicle body;
a protective device supported by the vehicle body, the protective device having a fastened state and a disengaged state;
a suspension system comprising a front suspension and a rear suspension, the front wheels being connected to the vehicle body by the front suspension, and the rear wheels being connected to the vehicle body by the rear suspension;
a prime mover system supported by the vehicle body for providing power to the off-road vehicle, at least one of the pair of front wheels or the pair of rear wheels being connected to the prime mover system, and the prime mover system at least comprising a power source;
a control module capable of controlling the operation of the power source;

a vehicle velocity detection module capable of detecting vehicle velocity and communicating with the control module; and an interaction module capable of communicating with the control module and interacting with a user of the off-road vehicle;

wherein, when the off-road vehicle is in a preset state below a first velocity threshold, the control module is capable of allowing the power source to operate at high rotational speed;

wherein, if the protective device is in the disengaged state, then the control module is capable of sending control commands to the interaction module, and the interaction module is capable in response to the control commands of providing at least one of a visual alert or an auditory alert;

wherein, if the off-road vehicle reaches the first velocity threshold while the protective device is in the disengaged state, the control module is capable of limiting a power source rotational speed to a controlled first value lower than the high rotational speed; and wherein, if the off-road vehicle is traveling faster than the first velocity threshold with the power source rotational speed being higher than the controlled first value when the protective device enters the disengaged state, the control module is capable of gradually reducing the power source rotational speed.

2. The off-road vehicle of claim 1, wherein after the vehicle has traveled at or above the first velocity threshold, if the protective device is reengaged, then the control module is capable of reentering the preset state and allowing the power source to operate at high rotational speed.

3. The off-road vehicle of claim 2, wherein, after reengagement of the protective device, the control module will not reenter the preset state and allow the power source to be operated at high rotational speed until after the vehicle has slowed beneath a second velocity threshold, the second velocity threshold being slower than the first velocity threshold.

4. The off-road vehicle of claim 3, wherein the second velocity threshold is no more than 70% of the first velocity threshold.

5. The off-road vehicle of claim 3, further comprising an instruction module, wherein, after reengagement of the protective device and before the vehicle has slowed beneath the second velocity threshold, the control module is capable of controlling the instruction module to provide at least one of visual instruction or auditory instruction to slow the vehicle in order to cancel the limitation of the power source rotational speed to the controlled first value.

6. The off-road vehicle of claim 1, wherein after the vehicle has traveled at or above the first velocity threshold, if the vehicle is slowed beneath a second velocity threshold which is lower than the first velocity threshold, then the control module is capable of reentering the preset state and allowing the power source to operate at high rotational speed even with the protective device disengaged.

7. The off-road vehicle of claim 6, wherein the second velocity threshold is no more than 10 km/h (6 mph).

8. The off-road vehicle of claim 1, wherein after the vehicle has traveled at or above the first velocity threshold, if the vehicle velocity is stopped, then the control module is capable of reentering the preset state and allowing the power source to operate at high rotational speed even with the protective device disengaged.

9. The off-road vehicle of claim 1, wherein after the vehicle has traveled at or above the first velocity threshold, if the protective device has been disengaged for a set period of time and the vehicle remains at or above the first velocity threshold, then the control module cuts off the power output of the power source.

10. The off-road vehicle of claim 1, wherein the control module limits power source rotational speed by attenuating a throttle by wire signal.

11. The off-road vehicle of claim 1, wherein the power source is an engine comprising a throttle system, a fuel system, and an ignition system, and wherein the control module limits power source rotational speed by at least one of the following: controlling the throttle system to adjust air supply, controlling the fuel system to adjust fuel supply, or controlling the ignition system to adjust the generation of electric sparks.

12. The off-road vehicle of claim 1, wherein the first velocity threshold is in the range of 16 km/h (10 mph) to 40 km/h (25 mph).

13. The off-road vehicle of claim 1, wherein the controlled first value is less than ⅔rds of the high rotational speed.

14. The off-road vehicle of claim 1, wherein, once the control module begins limiting the power source rotational speed to be at or below the controlled first value, an instruction module uses light or sound signals to inform the driver that the control module is limiting the power source rotational speed.

15. The off-road vehicle of claim 1, wherein the control module performs steps in a software or firmware loop.

16. The off-road vehicle of claim 1, wherein the control module performs steps in a software or firmware loop, and wherein the control module limits power source rotational speed by attenuating a throttle by wire signal.

17. An off-road vehicle comprising
a vehicle body;
at least one seat arranged on the vehicle body;
a safety belt for securing a driver in the at least one seat, the safety belt having a fastened state and a disengaged state;
a prime mover system supported by the vehicle body for providing power for locomotion of the off-road vehicle, the prime mover system at least comprising a power source;
a control module capable of controlling the operation of the power source;
a vehicle velocity detection module capable of detecting vehicle velocity and communicating with the control module; and
wherein, when the safety belt is in the disengaged state, whether the control module will control the power source to operate at a power source rotational speed which is at or beneath a controlled first value depends upon detected vehicle velocity of the off-road vehicle.

18. The off-road vehicle of claim 17, wherein, if the safety belt changes from the fastened state to the disengaged state while the power source rotational speed is above the controlled first value and while the detected vehicle velocity is above a first velocity threshold, the control module is capable of gradually reducing the power source rotational speed.

19. The off-road vehicle of claim 17, wherein, if the safety belt changes from the disengaged state to the fastened state while the power source rotational speed is being limited, the control module will ensure that the power source rotational speed is released from the controlled first value without immediate change in vehicle response.

20. A method of controlling a power source of an off-road vehicle, the off-road vehicle comprising:

a vehicle body;

at least one seat arranged on the vehicle body;

a safety belt for securing a driver in the at least one seat, the safety belt having a fastened state and a disengaged state;

a prime mover system supported by the vehicle body for providing power for locomotion of the off-road vehicle, the prime mover system at least comprising a power source; and a control module capable of controlling the operation of the power source;

the method comprising acts of:

detecting whether the safety belt is in the fastened state or the disengaged state;

detecting vehicle velocity; and having the control module limit the power source to operate at a power source rotational speed which is at or beneath a controlled first value depending upon both the detected vehicle velocity of the off-road vehicle relative to a non-zero first velocity threshold and whether the safety belt is in the fastened state or the disengaged state.

\* \* \* \* \*